(12) United States Patent
Barbastathis et al.

(10) Patent No.: US 7,173,662 B1
(45) Date of Patent: Feb. 6, 2007

(54) FOVEATING IMAGING SYSTEM AND METHOD EMPLOYING A SPATIAL LIGHT MODULATOR TO SELECTIVELY MODULATE AN INPUT IMAGE

(75) Inventors: George Barbastathis, Boston, MA (US); Jean-Jacques Slotine, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 758 days.

(21) Appl. No.: 09/845,809

(22) Filed: Apr. 30, 2001

(51) Int. Cl.
*H04N 5/225* (2006.01)
(52) U.S. Cl. .................................................. 348/342
(58) Field of Classification Search ............... 348/342; 382/181
See application file for complete search history.

(56) References Cited

U.S. PATENT DOCUMENTS

| | | | | |
|---|---|---|---|---|
| 4,575,193 A * | 3/1986 | Greivenkamp, Jr. | ......... | 359/495 |
| 5,453,844 A * | 9/1995 | George et al. | ............... | 382/264 |
| 5,555,129 A * | 9/1996 | Konno et al. | ............... | 359/569 |
| 5,991,551 A * | 11/1999 | Bacs et al. | ................... | 396/324 |
| 6,021,005 A * | 2/2000 | Cathey et al. | .............. | 359/737 |
| 6,107,617 A * | 8/2000 | Love et al. | ............... | 250/201.9 |
| 6,636,278 B1 * | 10/2003 | Dultz et al. | ................... | 349/25 |
| 6,771,422 B1 * | 8/2004 | Clark | .......................... | 359/625 |
| 2004/0037462 A1 * | 2/2004 | Lewis et al. | ................. | 382/181 |
| 2004/0101168 A1 * | 5/2004 | Kostrzewski et al. | ........ | 382/115 |
| 2004/0105100 A1 * | 6/2004 | Shirley | ........................ | 356/603 |

FOREIGN PATENT DOCUMENTS

DE   38 10946 A1   3/1988

OTHER PUBLICATIONS

Chang, E. et al., "Wavelet Foveation", Applied and Computational Harmonic Analysis, vol. 9, pp. 312-335, 2000.
"Foveated, Wide Field-of-View Imaging System Using Liquid Crystal Spatial Light Modulator," Martinez et al. *Optics Express*. May 2001. vol. 8, No. 10.

* cited by examiner

*Primary Examiner*—Vivek Srivastava
*Assistant Examiner*—James M. Hannett
(74) *Attorney, Agent, or Firm*—Gauthier & Connors, LLP

(57) ABSTRACT

An imaging system includes an image receiving unit for receiving an input image, and a spatial light modulator. The spatial light modulator is interposed between the image receiving unit and an input image. The spatial light modulator is for selectively modulating the input image such that at least one portion of the input image may be blurred as it passes through the spatial light modulator toward the image receiving unit.

15 Claims, 5 Drawing Sheets

FOVEATING IMAGING SYSTEM AND METHOD EMPLOYING A SPATIAL LIGHT MODULATOR TO SELECTIVELY MODULATE AN INPUT IMAGE

BACKGROUND OF THE INVENTION

The invention relates to imaging systems, and in particular relates to systems in which images are recorded for electronic processing.

Conventional imaging systems in which images are recorded for electronic processing typically involve the use an array of discrete elements for recording portions of the image, such as a charge coupled device (CCD) array, or a CMOS phototransistor array. For example, as shown in FIG. 1, a conventional imaging system 10 may include an array 12 of image recording elements 14, each of which receives a portion 16 of an image. Devices incorporating such arrays are used for a variety of purposes, including cameras, scanners, monitoring equipment, and robotic vision systems etc.

The resolution of the recorded image depends on the number and size of elements in the array. Although high resolution imaging systems are preferred for certain applications requiring detailed images, high resolution imaging systems generally require more time and memory to capture, process, and transfer the images, than required by lower resolution imaging systems.

Many images contain a significant amount of detail in some areas, but much less detail in other areas. For example, an image may include a human face in the foreground and a statue and sky in the background. The human face may include a relatively large amount of detail, the statue less, and the sky may include the least amount of detail. Certain processing systems, such as file transfer systems, identify the areas of less detail, and compress the data required to represent the image by identifying large contiguous groups of picture elements that are the same as one another. For example, if a portion of an image includes a large number of picture elements that are repetitious, e.g., blue sky, then a single value is identified as applying to the appropriate number of picture elements, instead of representing each of the identical picture elements with separate but equal values.

While such compression algorithms may facilitate certain processing steps such as file transfers, there remains a need to originally capture an image in a more efficient fashion. In particular, there is a need for an imaging system that may selectively obtain high and low resolution data from the same image.

SUMMARY OF THE INVENTION

The invention provides an imaging system for receiving images. The system includes an image receiving unit for receiving an input image, and a spatial light modulator. The spatial light modulator is interposed between the image receiving unit and an input image. The spatial light modulator is for selectively modulating the input image such that at least one portion of the input image may be blurred as it passes through the spatial light modulator toward the image receiving unit. In an embodiment, the spatial light modulator includes an array of birefringent elements, and in another embodiment of the invention, the spatial light modulator includes a liquid crystal cell.

BRIEF DESCRIPTION OF THE DRAWINGS

The following description may be further understood with reference to the accompanying drawings in which.

Figure 1:
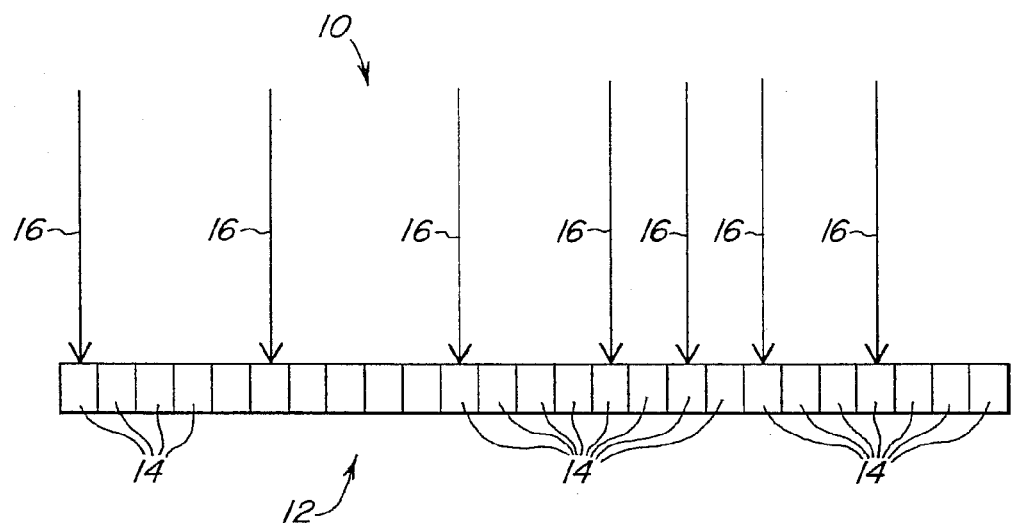
FIG. 1 shows an illustrative view of a prior art imaging system.

The drawings are shown for illustrative purposes and are not to scale.

DETAILED DESCRIPTION OF THE INVENTION

A system 20 in accordance with an embodiment of the invention includes an array of birefringent elements 22 fabricated on top of a standard optical detector array 24 (e.g., a CMOS camera or CCD array). By selectively applying voltage to the birefringent elements, the user may effect space-variant filtering functions. Applications include non-mechanical foveation, multi-resolution visual processing, monocular depth perception, and modular volume holography, etc. Foveation relates to an attention-like function that permits a vision system to capture the more interesting aspects of the environment while maintaining low information bandwidth. These functions contribute to the solution of significant problems in robotics and other artificial intelligence applications.

Systems of the invention generally simulate the retinal function of the human eye that not only captures images, but also acts as a filter so that more detail is captured in some areas than in other areas. For example, retinal cells with lateral connections edge-enhance, and intensity-equalize the retinal images. Most of these operations contribute to a reduction of visual information from the approximately $250 \times 10^6$ retinal detectors (rods and cones) to the approximately $1 \times 10^6$ neuronal fibers that comprise the optic nerve. The detectors themselves are distributed in an information-efficient way. Densely distributed cones are found at the fovea, which is a small circular path surrounding the intersection of the retina with the optic axis of the eyeball; this is the area where the optical quality of the retinal images is best, and it also matches the direction of the subject's gaze. Peripheral retinal areas are more sparsely populated by rods, which are sensitive only to the intensity of the light and not the color.

The retinal detector distribution together with eye motion serve as the hardware implementation of the cognitive function of attention. In the top-down form of attention, the gaze is fixed toward the direction where the subject intends to direct his or her attention, and high-resolution imaging is obtained in that area. Low-resolution peripheral vision serves bottom-up attention, which allows subjects to redirect their cognitive resources to new objects of interest.

Attention is Nature's solution to a computational dilemma—it reduces the degrees of freedom of sensory signals so as to maintain at any given instant in time the most important information. The mechanism of visual attention in humans is not completely understood, but the physiology of the retina strongly supports the hypothesis that the sensory architecture of the human visual system is well tuned to attentional processing. This observation strongly suggests that attention-like mechanisms might enhance the computational capabilities of computers in contexts such as robotics and combinatorial algorithms. In short, attention algorithms make more efficient use of the hardware capabilities of a given computational structure.

Figure 2:
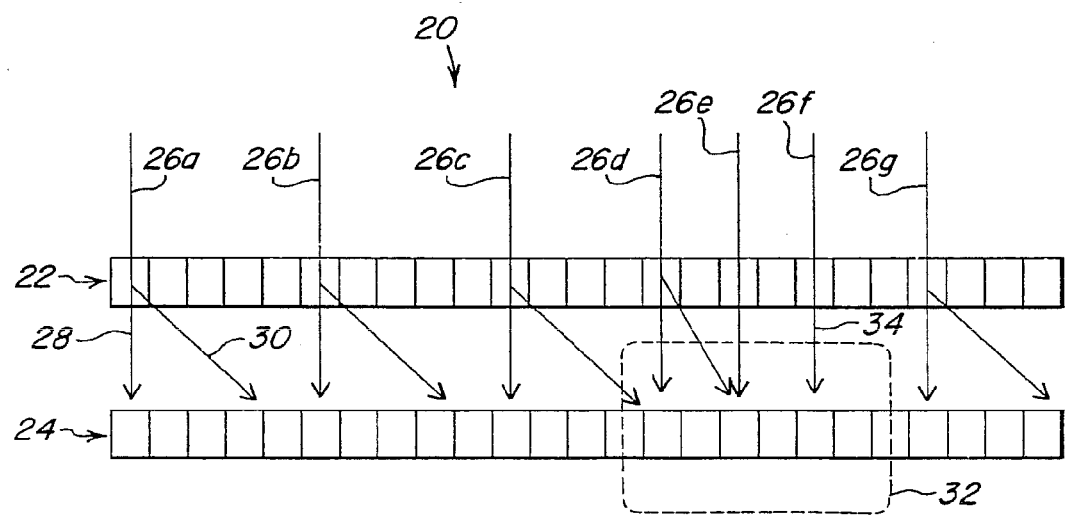
FIG. 2 shows an illustrative view of an imaging system in accordance with an embodiment of the invention.

Attention has been implemented in artificial systems in the past, predominantly in silicon retinas, which mimic the human retina in a number of functions, including tremendous dynamic range, the ability to foveate and to perform simple image processing functions such as edge extraction and tracking. Silicon detectors with variable resolution have also been implemented. Fabrication constraints, however, dictate that the resolution varies in steps, whereas in the human retina the resolution degradation is continuous from the fovea outward. The present invention provides a system that permits the implementation of arbitrarily variable resolution across the aperture of an imaging system, and allows the shift of the attentional focus to be implemented non-mechanically, which reduces the failure probability and maintenance costs and may also be beneficial for certain applications, such as security monitoring. In addition to the general-purpose attentional mechanisms discussed above, systems of the invention may be used for other related applications such as monocular depth perception, nonlinear image processing, and real-time image filter-banks. Also, systems of the invention may be used to permit selective blurring in areas specified by an image compression algorithm With reference again to the embodiment shown in FIG. 2, a system of the invention includes an array 22 of tunable birefringent cells superimposed over an array 24 of optical detectors. Liquid crystal cells may be used for the tunable birefringent cell array (TBCA). Examples of optical detector arrays are CCD arrays and CMOS photo-transistor arrays. Assuming that the illumination is incoherent, the function of the device in a relatively simplified form is described as follows: Each ray, e.g., 26a–26g, that enters the device splits into two parts by virtue of the phenomenon of double refraction at the interface between air and the first-layer birefringent cell that finds itself in the path of that ray. The first split part, e.g., 28, known as ordinary beam, propagates undeviated through the cell to the associated detector cell. The second part, e.g., 30, referred to as extra-ordinary beam, splits apart from the ordinary beam, and is deflected by an amount that depends on the birefringent characteristics of the material. In particular, the angle of deflection of the extra-ordinary beam is set by the indices of refraction along the principal axes of the material, and the orientation of the system of principal axes. In electro-optic materials, such as liquid crystals, the principal axes change their orientation in response to externally-applied electric fields. In the disclosed device, the amount of deflection of the extra-ordinary ray is set individually in each cell by voltages applied to transparent electrodes attached to the cells. Therefore, the invention allows the user to specify variable amounts of deviation across the field of view of the device such that a certain area, e.g., the area indicated at 32, may record image data with a higher resolution than that of the remaining portions of the device. Moreover, certain of the birefringent cells may be turned off, so that only one beam (the ordinary beam) is passed through the cells as shown, for example, at 34 in FIG. 2.

Figure 3:
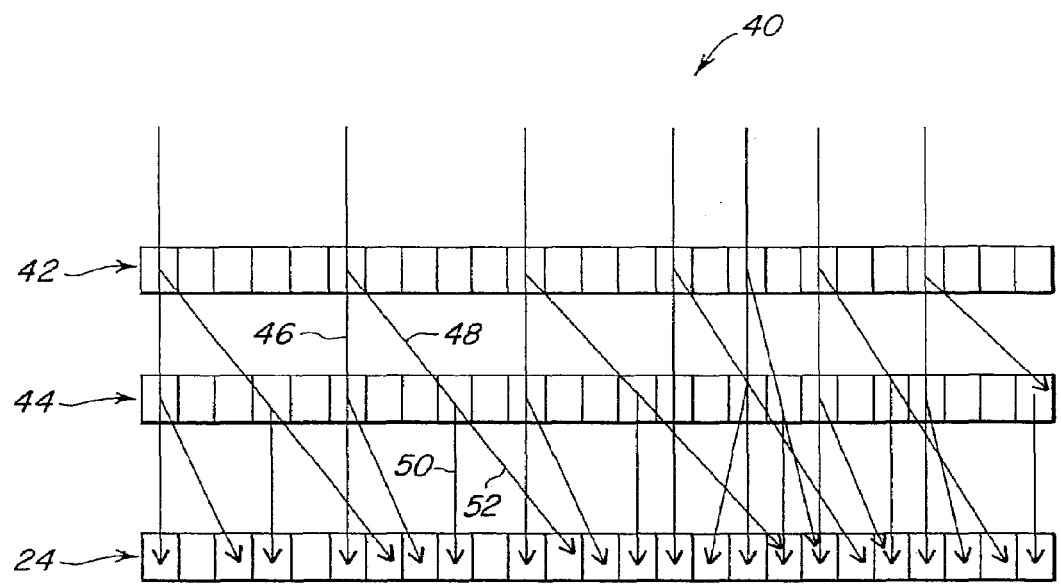
FIG. 3 shows an illustrative view of an imaging system in accordance with another embodiment of the invention.

As shown in FIG. 3, in another embodiment of a system 40 of the invention, multiple arrays of birefringent elements 42, 44 may be employed. Upon exiting the array 42, the ordinary beams, e.g., 46, and extra-ordinary beams, e.g., 48, encounter one or more further arrays such as array 44 of similar tunable birefringent cell arrangements, each effecting further splitting of the original ray into another ordinary beam, e.g., 50, and extra-ordinary beam, e.g., 52. By selecting the cell axes to be in the appropriate orientations, multiple splitting may occur in-plane, as shown in FIG. 3, as well as in the perpendicular direction.

Upon exiting the $m^{th}$ layer of an m-layer stack, the optical power contained in each entering ray is split into N parts where $2 \leq N \leq 2^m$. If the angular deviations are sufficiently large, then each of the extraordinary beams is incident on a different cell of the detector array. This diffusion of optical power among neighboring cells is equivalent to a low-pass filtering (blurring) operation effected by the tunable birefringent elements.

The operation of the tunable birefringent cell array (TBCA) filter is described as follows. If $f(x,y)$ denote the image that would have formed on the detector array by a regular imaging system, i.e., in the absence of the TBCA, then x, and y are the coordinates of the detector array plane, and are recorded at the coordinates $x_j$, $y_j$ of the center of the $j^{th}$ pixel (j=1 . . . P, where P is the total number of pixels on the detector array). For example, in many commercial CCD cameras P=640×480=307,200. Each TBCA layer introduces a spill-over of some pixel energy from pixel $(x_j, y_j)$ to one or more neighboring pixels $(x_{j+p}, y_{j+q})$ in the next layer, where p, and q are integers that depend on the state of the $(x_j, y_j)$ cell at the original layer. The overall operation of the multi-layer TBCA's is then described as a linear filtering operation as follows:

$$g(x,y)=\int\int f(x',y')h(x,y;x',y')dx'dy'$$

where $g(x,y)$ is the actual filtered image forming on the detector plane, and $h(x,y;x',y')$ is a shift variant kernal defined by the TBCA. Note that if all of the cells within each layer are set to the same birefringent state, then the filter becomes shift-invariant, and the above equation becomes a convolution. A significant benefit of the present invention is that it enables the implementation of arbitrary, not necessarily shift-invariant filters that may be adapted in real time to perform real-time image processing operations. For incoherent illumination, however, the class of implementable filters is limited to positive definite operators, i.e., $h(x,y;x',y')$ is constrained to be a positive-definite operator. Coherent illumination, on the other hand, permits the implementation of additional further general complex-valued filters.

The above filter essentially provides a method for adaptively interconnecting pixels of the same image, and is believed to provide benefits (such as cost benefits) over electronic interconnects that may implement shift-variant filters. Optical interconnects using holograms have also been used extensively in research and offer extremely high interconnect capacity and adaptability. Such adaptive operation, however, generally comes at the expense of optical power because the diffraction efficiency of holograms is typically well below 100%. Real-time holography hardware is also relatively bulky, sensitive to vibration, and expensive to realize in industrial or outdoors environments.

Figure 4:
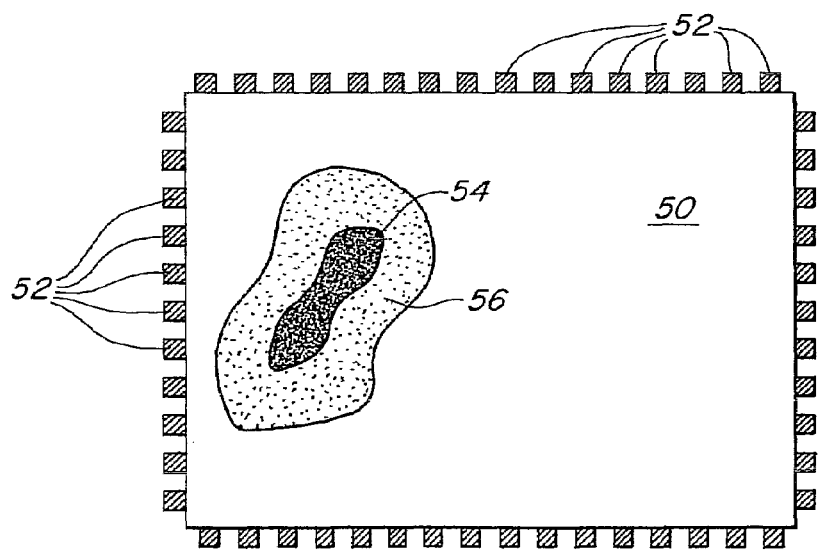
FIG. 4 shows an illustrative view of an imaging system in accordance with a further embodiment of the invention.

The implementations discussed above have been discrete, where splitting is controlled by individual birefringent cells. A continuous implementation may offer advantages by eliminating sampling artifacts and allowing smoother filtering operations. As shown in FIG. 4, a single large liquid-crystal cell 50 is surrounded by an array of electrodes 52. By applying individual voltages to the electrodes 52, an electric field distribution is created in the interior of the cell 50. The distribution is found by solving Poisson's equation for the potential in the cell interior, with the electrode voltages as boundary conditions; the inverse problem of determining the electrode voltages that give a particular field distribution inside the cell is more difficult. Once the electric field is established, the liquid crystal molecules reorient themselves in response, leading, for example, to the distribution shown in FIG. 4 in which the region 54 provides high resolution, the region 56 less, and the remaining portions of the cell 50 the least amount of resolution. This is a continuous (in the space domain) implementation of the shift-variant filter. Note that interesting time dynamics may observed in the scheme as well, due to the typically slower time response of liquid crystals in these configurations.

Figure 5:
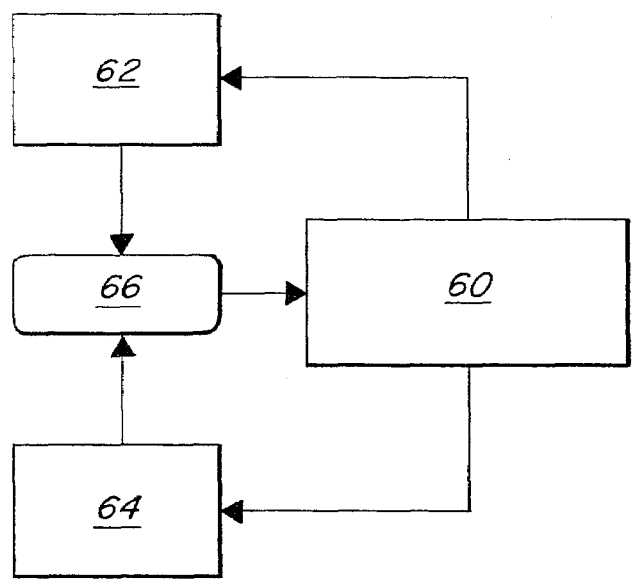
FIG. 5 shows an illustrative diagrammatic view of the operation of a system of the invention.

The disclosed invention may be used to implement top-down and bottom-up attention with non-mechanical foveation by implementing the feedback loop shown in FIG. 5. Suppose that at a given time instance t, the multi-layer TCBA is implementing a shift variant filter 60 that may be represented as $h_i(x,y;x',y')$. In this embodiment, the high-resolution information from the attentional focus is interesting to higher-level cognitive processing functions. The top-down attentional algorithm 62 will typically attempt to maintain the focus at its current location or move it according to its own primitives. On the other hand, peripheral information (which is typically at low resolution) often signifies abrupt changes that can be critical for the performance of the robot or its own survival. For example, abrupt motion may signify a sudden threat. Low-level (bottom-up) attentional processing routines 64 evaluate the significance of peripheral information and compete with the top-down routines for the filter function $h_{i+1}(x,y;x',y')$ at the next time step. A controller algorithm 66 synthesizes both processing algorithms 62 and 64. Interesting dynamics are obtained if the two attentional mechanisms are not returning their results concurrently.

Figure 6:
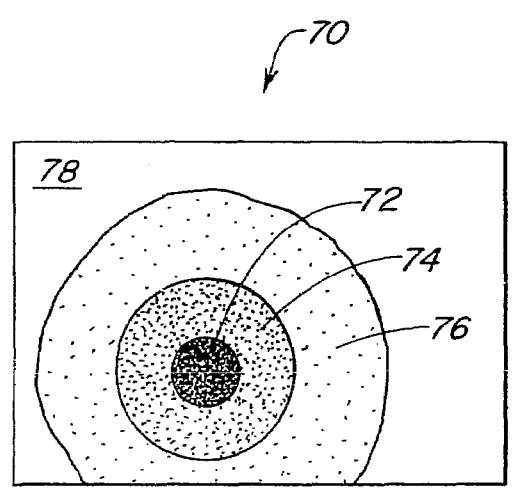
FIGS. 6–8 show illustrative views of imaging systems in accordance with further embodiments of the invention.
Figure 7:
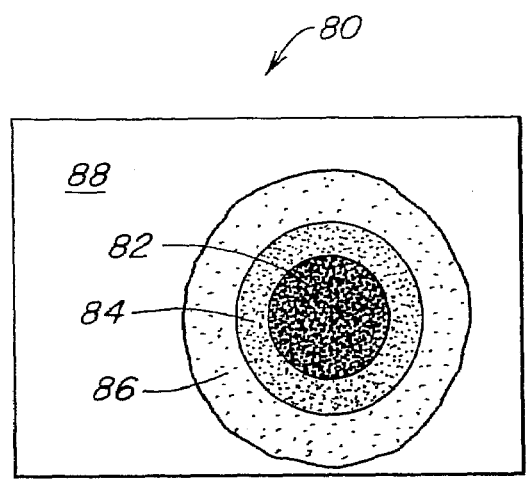
Figure 8:
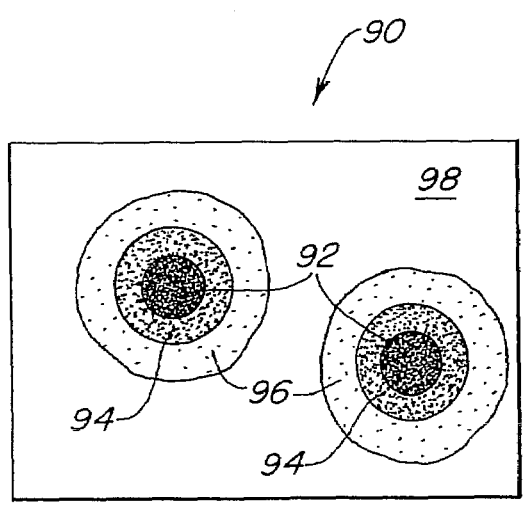

Note that the non-mechanical foveating mechanism described herein enables attentional modes that are not available in the visual systems of known species. For example, foveating without motion has the obvious advantage of higher speed as well as stealthiness. Another example is the reallocation of computational resources by varying the shape of the attentional focus, or allowing for multiple foci. For example, as shown in FIG. 6, a system 70 in accordance with another embodiment of the invention may provide a relatively small area of high resolution 72, another area of less resolution 74, a further area of even less resolution 76, and the remaining area of the least resolution 78. As shown in FIG. 7, another embodiment 80 of the invention provides a relatively large area of resolution 82, another area of less resolution 84, a further area of even less resolution 86, with the remaining area providing the least amount of resolution 88. Finally, as shown in FIG. 8, a further still embodiment 90 provides multiple foci 92 of high resolution, multiple areas of less resolution 94, multiple areas of even less resolution 96, with remaining areas providing the least amount of resolution 98.

Figure 9:
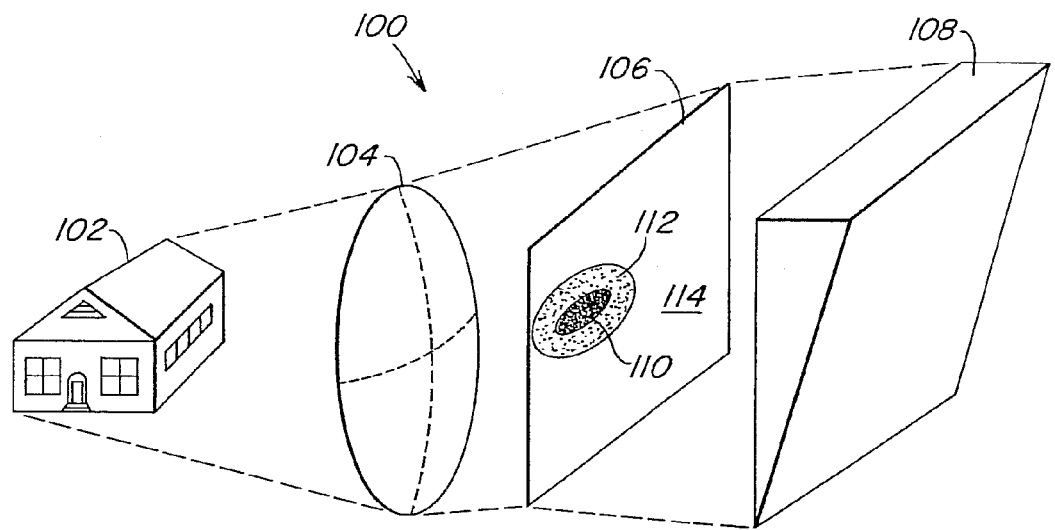
FIG. 9 shows an illustrative view of an interferrometric imaging system incorporating an imaging system of the invention.

The disclosed device may be combined with a depth-sensitive optical system to provide monocular depth perception over an extended field of view. Depth-sensitive optical methods such as chirp-shear interferometry and volume holographic imaging may be developed. In such systems, depth perception is complicated by the lateral content of the images, particularly if the depth variation within the field of view is relatively large. The disclosed invention permits arbitrary allocation and width of the field of view where the depth is measured; the remainder of the system's natural field of view is blurred, eliminating spurious information. This narrow depth-sensitive focus is then scanned to obtain depth information over the entire natural field of view of the system. An example of a system 100 of the invention employed to provide monocular depth perception in this mode is shown in FIG. 9 in which the image of a three dimensional object 102 is received through an imaging lens 104 and spatial light modulator 106 prior to being received by a depth-sensitive imaging system such as a chirp shear interferometer 108. The modulator 106 may provide areas of varying resolution 110, 112 and 114 as shown with area 110 proving the highest resolution and the area 114 providing the least resolution respectively.

Figure 10:
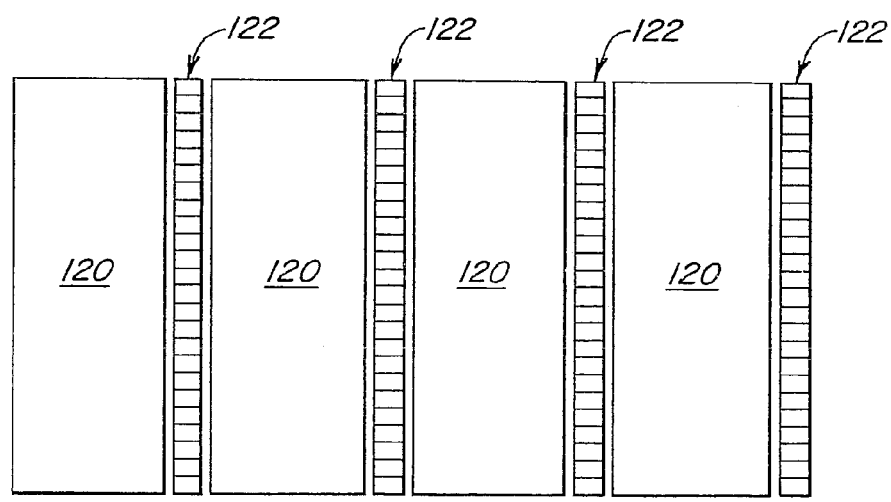
FIG. 10 shows an illustrative view of a holographic imaging system incorporating an imaging system of the invention.

A further application of the invention is the use of the non-mechanical fovea to create an adaptive volume hologram as shown in FIG. 10 in which volume holographic elements 120 are interspersed with spatial light modulators 122 of the invention. In this case, the preferred method of illumination is with a coherent source. Volume holography has been used for data storage, artificial neural networks, and, recently, for imaging. The information stored in a volume hologram is typically addressed by changing some property of the readout beam, e.g. the angle or location of incidence or the wavelength. Stratified (multi-layered) volume holograms have also been implemented. The non-mechanical fovea may be used to enable a new mode of reading out stratified volume holograms by changing the path of the optical fields as they propagate a multi-layer structure, as shown in FIG. 10. In this structure, each volume holographic layer may be considered one stage of processing the information. The intermediate non-mechanical foveas generate coherent superpositions of multiple states of the interaction between the input field and the information stored in the hologram. The resulting structure may lead to powerful new optical processing paradigms, since it is essentially an adaptive volume hologram without the stability and power-consumption requirements of conventional structures.

Those skilled in the art will appreciate that numerous modifications and variations may be made to the above disclosed embodiments without parting from the spirit and scope of the invention.

What is claimed is:

1. An imaging system for receiving images, said system comprising:
   an image receiving unit for receiving an input image; and
   a spatial light modulator interposed between said image receiving unit and an input image, said spatial light modulator including a first area for selectively refracting the input image only along a principle axis of refraction toward said image receiving unit, and a second area for selectively refracting the input image along the principle axis of refraction and along a second axis of refraction, said second axis of refraction being angularly disposed to said principle axis of refraction such that a first portion of the input image that passes through the first area of said spatial light modulator is not blurred, while a second portion of the input image that passes through the second area of said spatial light modulator is blurred.

2. An imaging system as claimed in claim 1, wherein said image receiving unit comprises an array of photodetector cells.

3. An imaging system as claimed in claim 1, wherein said spatial light modulator comprises an array of liquid crystal opto-electronic elements.

4. An imaging system as claimed in claim 1, wherein said system includes a plurality of spatial light modulators interposed between the input image and said image receiving unit.

5. An imaging system as claimed in claim 1, wherein said image receiving unit includes a holographic material.

6. An imaging system as claimed in clam 1, wherein said image receiving unit includes a robotic vision system.

7. An imaging system as claimed in clam 1, wherein said image receiving unit includes a visual monitoring system.

8. An imaging system as claimed in claim 1, wherein said imaging system further includes a control unit for varying the angular direction of said second axis of direction with respect to said principle axis of refraction.

9. An imaging system as claimed in claim 1, wherein said spatial light modulator comprises an array of birefringent elements for selectively effecting a blurring of the input image.

10. An imaging system as claimed in claim 9, wherein birefringent characteristics of each birefringent element are selectively controlled independent of other birefringent elements.

11. An imaging system as claimed in claim 1, wherein said spatial light modulator includes liquid crystal cell.

12. An imaging system as claimed in claim 11, wherein said liquid crystal cell is surrounded along its periphery by a plurality of electrodes.

13. An imaging system for receiving images, said system comprising:
   an image receiving unit for receiving an input image; and
   a spatial light modulator interposed between said image receiving unit and an input image, said spatial light modulator including:
     a first area for selectively refracting the input image only along a principle axis of refraction toward said image receiving unit,
     a second area for selectively refracting the input image along the principle axis of refraction and along a second axis of refraction, said second axis of refraction being angularly disposed to said first axis of refraction such that a first portion of the input image that passes through the first area of said spatial light modulator is not blurred, while a second portion of the input image that passes through the second area of said spatial light modulator is blurred, and
     a third area for selectively refracting the input image along the principle axis of refraction and along a third axis of refraction, said third axis of refraction being angularly disposed to said first axis of refraction such that a first portion of the input image that passes through the first area of said spatial light modulator is not blurred, while a third portion of the input image that passes through the third area of said spatial light modulator is blurred.

14. The imaging system as claimed in claim 13, wherein said first axis of refraction is substantially normal to the imaging receiving unit.

15. An imaging system for receiving images, said system comprising:
   an image receiving unit for receiving an input image; and
   a spatial light modulator interposed between said image receiving unit and an input image, said spatial light modulator including:
     a first area for selectively refracting the input image only along a principle axis of refraction toward said image receiving unit at a first angle with respect to said imaging unit,
     a second area for selectively refracting the input image along the principle axis of refraction and along a second axis of refraction at a second angle with respect to said imaging unit such that a first portion of the input image that passes through the first area of said spatial light modulator is not blurred, while a second portion of the input image that passes through the second area of said spatial light modulator is blurred, and
     a third area for selectively refracting the input image along the principle axis of refraction and along a third axis of refraction at a third angle with respect to said imaging unit such that a first portion of the input image that passes through the first area of said spatial light modulator is not blurred, while a third portion of the input image that passes through the third area of said spatial light modulator is blurred, said second angle being between said first angle and said third angle.

* * * * *